J. C. POTTER.
COMBINED BALE BREAKER, AUTOMATIC FEEDER, AND OPENER.
APPLICATION FILED JAN. 4, 1911.
1,015,764.
Patented Jan. 23, 1912.
2 SHEETS—SHEET 1.
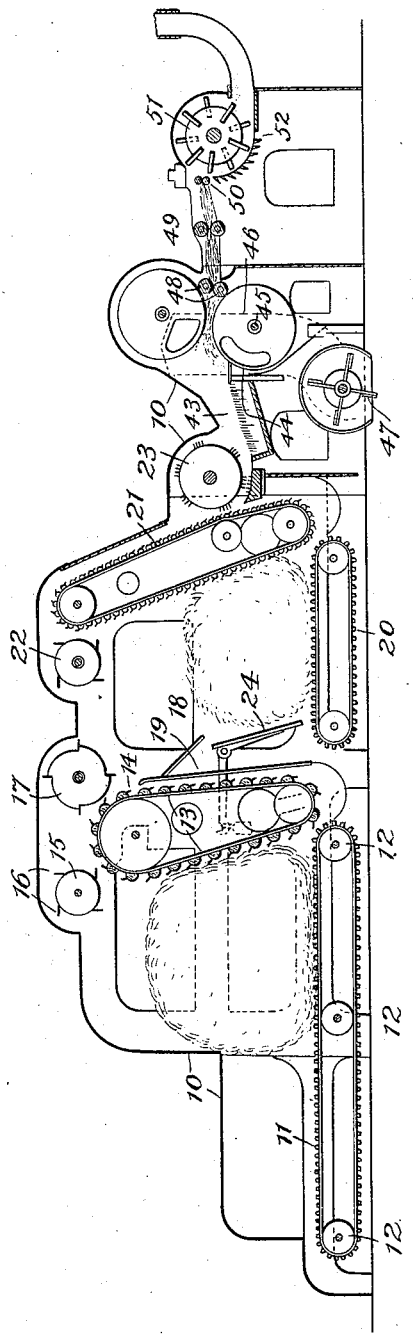

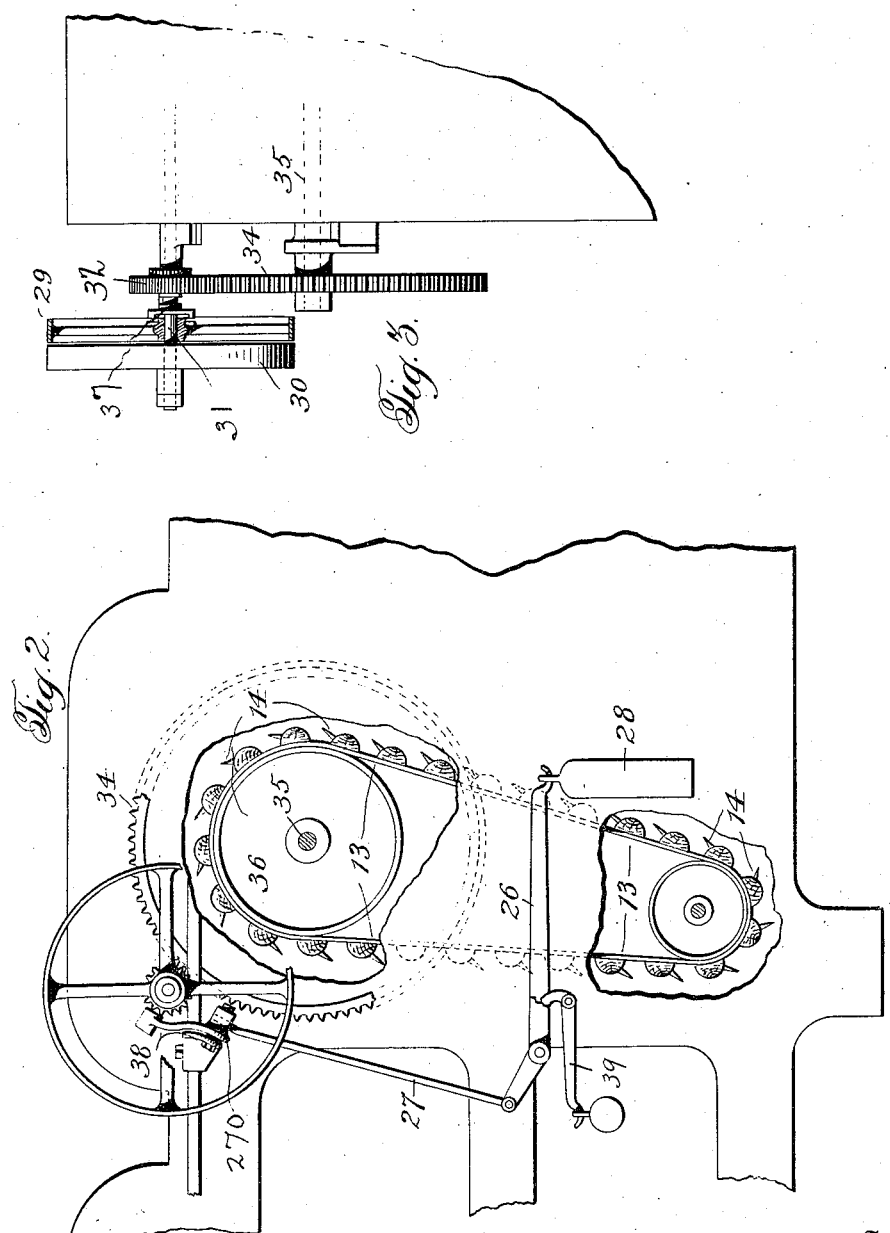

UNITED STATES PATENT OFFICE.

JAMES CHARLES POTTER, OF PAWTUCKET, RHODE ISLAND.

COMBINED BALE-BREAKER, AUTOMATIC FEEDER, AND OPENER.

1,015,764.  Specification of Letters Patent.  Patented Jan. 23, 1912.

Application filed January 4, 1911. Serial No. 600,791.

*To all whom it may concern:*

Be it known that I, JAMES C. POTTER, of Pawtucket, in the county of Providence and in the State of Rhode Island, have invented a certain new and useful Improvement in Combined Bale - Breakers, Automatic Feeders, and Openers, and do hereby declare the following is a full, clear, and exact description thereof.

My invention relates to cotton handling machines, and my object is to provide a machine for this purpose which will require no special care in feeding the baled cotton to the machine, in order to have the proper quantity of cotton passed through the machine which it is able to take care of, to secure the production by the machine of a uniform lap, and for the attainment of this object, I provide the machine with a feeder that automatically takes care of the baled cotton delivered to the machine, so as to assure the passage through the machine of a regulable quantity of cotton. Aside from this automatic control of the feed of the cotton, the invention has in view the use of other means contributing to the production of an even or uniform lap, and it also has in view the production of a compact structure, and one which in its operations is a very clean one, the machine in this last-named respect being an important improvement because machines for the same purpose with which I am acquainted are exceedingly dirty.

In the accompanying drawings Figure 1 is a view partly in side elevation and partly in section of a machine embodying my invention; Fig. 2 a detail view in perspective of the automatic devices for controlling the feed of the cotton through the machine; and Fig. 3 a detail view in transverse section through the dust flue and fan casing.

In the embodiment of my invention which I have selected to illustrate my invention, the machine has a combined frame and casing 10, by which the mechanism that operates on the cotton while passing through the machine is as completely inclosed as possible, at one end of which near the floor is a horizontal slatted apron 11. The apron is supported by rollers 12, and motion is imparted to them by suitable gearing. The cotton from the bale is placed upon the apron 11, and thereby carried to a vertically traveling slatted apron 13, the slats of which are provided with inclined tines or spikes 14, which catch the cotton brought by the horizontal apron 11, and carry it upward contiguous to a cylinder 15 arranged near the top of the machine, and having blunt pins or teeth 16 by which any bunches of cotton are opened up or knocked from the spiked apron. Passing the pin cylinder, the cotton is carried by the spiked apron contiguous to a doffer cylinder 17 by which the cotton is removed from the spiked apron and falls into a feeding compartment or chamber 18, said chamber having a downwardly and forwardly inclined end wall 19 to which the cotton from the doffer cylinder is discharged. At the bottom of said feeding chamber or compartment, is a horizontal slatted apron 20 similar to the apron 10, by which cotton is moved forward as it falls into the compartment or chamber, and is received at the forward end of the chamber by a slatted spiked apron 21 arranged vertically, the spikes of which, however, are smaller than the spikes of the apron 13, because by this time the cotton has been sufficiently opened to admit of use of the smaller spikes, and contiguous to the upper end of said spiked apron 21, at the rear side thereof, is a pin cylinder 22 to break up any masses or bunches of cotton too large to be carried or fed onward, and there is a doffer roller 23 for removing the cotton from the spikes of the apron 21.

In the feeding chamber or compartment 18, I provide for the automatic regulation of the quantity of cotton to render uniform or even the lap delivered from the machine, and I may do this by means of a "feeler" that is hinged or pivoted in the chamber or compartment consisting of a horizontally swinging board 24, and which is moved to and fro by variations in the quantity of cotton delivered to the compartment or chamber, it swinging forward when there is a smaller quantity of cotton, and rearward when there is a larger quantity. Said board tends normally to swing forward or in contact with the cotton, such movement being produced by means of a crank arm 26 on the shaft or pivot of the board outside the casing from which is suspended a weight 28. I utilize the to and fro motion of the hinged board to control the movement of the first spiked apron to which the cotton is delivered, the movement of said apron being stopped when the quantity of cotton to be fed onward from the compartment or chamber is exceeded in said chamber, and started and the movement continued when the right quantity of cotton is in the compartment or chamber. This I accomplish by employing belt gearing to impart motion to said apron, which belt gearing comprises fast and loose pulleys 29 and 30, respectively, and a belt that runs to a driving pulley. The shaft 31 of the fast and loose pulleys has a pinion 32 in mesh with a gear 34 on the shaft 35 of the upper roll 36 of the spiked apron 21. A clutch 37 on the shaft 31, is engaged by a lever 270, pivoted to a bracket 38, and connected by a link 27 to the lever 26 from which is suspended the weight 28. To insure a quick movement of the clutch 37 into engagement with the fast pulley 29, a weighted lever 39 is provided that has a finger 40 which engages notches 41 in the lever 26, and which by opposing the movement of the lever 26 under cotton pressure until the latter is sufficient, suddenly to overcome the resistance, avoids hammering of the clutch teeth. Of course other forms of gearing, and automatic operating mechanisms, may be employed, in place of that which I have illustrated and described as constituting an embodiment of my invention.

It will be evident that regardless of the quantity of cotton that is placed upon the feeding apron 11, only the quantity that the machine can take care of to produce the desired lap will find its way through the machine.

From the second spiked apron 21, the cotton is delivered to a chamber 43 in which is mounted a wire or other open-work cage 44 on a horizontal shaft 45, and from one end of said cage a flue or air trunk 46 leads downward to an exhaust fan 47 mounted in a suitable casing below the cage. Air is thus drawn through the cage from the compartment above it, into which the cotton is delivered, and the result is that cotton is distributed over the entire upper surface of the cylinder or cage. This operation is an important factor in assuring an even or uniform lap. The air drawn through the cage by the fan is taken from the end of the machine to which the baled cotton is delivered so that there is a current of air constantly passing through the machine from end to end that carries with it to the fan the dirt and dust given off in the operation of the machine, so that no dirt or dust escapes from the machine into the room. A suitable dust box is provided into which the dust is delivered from the fan into a dust room.

From the cage the cotton is drawn by a pair of rollers 48, and after passing a polygonal sided roller 49, is taken by a pair of feed rolls 50 and delivered to the cylindrical beater 51, and the screen formed of angle bars 52, arranged concentric with the beater, thence to be delivered from the machine either to a cleaning trunk or a lap head.

My machine having the two chambers containing respectively the spiked aprons 13 and 21, is a double hopper feeder, and as a constant quality of cotton is maintained in the second chamber or hopper, the spiked apron 21 thereof acts under uniform conditions and accordingly delivers a regular quantity of cotton. The current of air drawn through the machine by the suction fan circulates through the hoppers so that it comes in close contact with the tumbling cotton therein with a very beneficial action upon it so that the efficiency of the cleaning and seasoning is increased, and, of course, there is the important advantage of preventing dust and fly from escaping into the room. The machine delivers an even regular sheet of cotton to the feed rolls 50 of the first beater 51, thereby giving a constant and even sheet for the beater to operate on and the sheet being uniform or even the cotton is held firmly between the feed rolls with no thin places to be drawn through without beating. The cotton when it arrives at the feed rolls 50 is thoroughly loosened up and bloomed ready for beating without danger of injuring the staple. The machine will handle cotton either directly from the bale or from mixing bins.

I regard the machine constructed as I have shown and described as the best embodiment of my invention, especially in respect to the organization of the various elements thereof in one compact structure of directly related elements, but while this is the case, I do not restrict myself only to such an embodiment of my invention.

Having thus described my invention what I claim is—

1. The combination of two hoppers receiving cotton in succession, a cotton carrier at the bottom of each, a vertically traveling apron situated between the two hoppers, a board movable to and fro in the second hopper, driving mechanism for said apron, means controlling said driving mechanism, a connection between said means and said board, condensing rolls, and means to carry the cotton from the second hopper to the condensing rolls.

2. The combination of two chambers which receive the cotton in succession and constituting a double hopper, means for passing the cotton from one chamber to the other, means for passing the cotton from said last mentioned or second chamber, automatic means for controlling the supply of cotton to said second chamber, a beater, and means for causing air to pass through said chambers and toward the beater.

3. The combination of two chambers, means situated between the two chambers for taking cotton from one and delivering it to the other, a feeler in the second chamber for controlling the supply of cotton thereto, means for passing cotton from the second chamber, and an exhaust fan located beyond the two chambers and drawing air therethrough.

4. The combination of a horizontally traveling cotton-receiving apron, a vertically traveling spiked apron taking cotton from the horizontally traveling apron, a chamber into which the cotton is delivered from the spiked apron, automatically operated driving mechanism for the spiked aprons, controlled by cotton in said chamber, a spiked apron taking cotton from said chamber, a cage receiving cotton from said last named spiked apron, and an exhaust fan communicating with the interior of said cage.

In testimony that I claim the foregoing I have hereunto set my hand.

JAMES CHARLES POTTER.

Witnesses:
EARL H. ROBERTS,
ELVERY LINGARD.

---

Copies of this patent may be obtained for five cents each, by addressing the "Commissioner of Patents, Washington, D. C."